(12) United States Patent
Huang et al.

(10) Patent No.: US 9,874,782 B2
(45) Date of Patent: Jan. 23, 2018

(54) CURVED LIQUID CRYSTAL DISPLAY DEVICE

(71) Applicant: AU Optronics Corporation, Hsin-chu (TW)

(72) Inventors: Chi-Chen Huang, Hsin-chu (TW); Ren-Mei Tseng, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 91 days.

(21) Appl. No.: 14/988,798

(22) Filed: Jan. 6, 2016

(65) Prior Publication Data

US 2016/0209692 A1    Jul. 21, 2016

(30) Foreign Application Priority Data

Jan. 21, 2015 (TW) .............................. 104102011 A

(51) Int. Cl.
*G02F 1/13363* (2006.01)

(52) U.S. Cl.
CPC ............ *G02F 1/13363* (2013.01); *G02F 2001/133631* (2013.01); *G02F 2413/08* (2013.01)

(58) Field of Classification Search
CPC ................................................. G02F 1/13363
See application file for complete search history.

(56) References Cited

U.S. PATENT DOCUMENTS

| 2007/0058118 | A1* | 3/2007 | Cirkel | G02F 1/133305 349/117 |
| 2011/0317084 | A1 | 12/2011 | Lee et al. | |
| 2014/0218668 | A1* | 8/2014 | Sakai | G02F 1/13363 349/102 |
| 2015/0146142 | A1* | 5/2015 | Kang | G02F 1/133634 349/102 |
| 2015/0301384 | A1* | 10/2015 | Koike | G02F 1/1336 349/65 |
| 2016/0195660 | A1* | 7/2016 | Nakao | B29C 47/0021 359/489.07 |

FOREIGN PATENT DOCUMENTS

TW       201128272 A1     8/2011

* cited by examiner

*Primary Examiner* — Edmond Lau
(74) *Attorney, Agent, or Firm* — McClure, Qualey & Rodack, LLP

(57) ABSTRACT

A curved liquid crystal display device includes an upper substrate, a lower substrate, a liquid crystal layer, an upper polarizer film, a lower polarizer film and a plurality of patterned optical compensation films. The upper substrate has a first inner surface and a first outer surface. The lower substrate is disposed opposite to the upper substrate. The lower substrate has a second inner surface and a second outer surface. The liquid crystal layer is sandwiched between the upper substrate and the lower substrate. The upper polarizer film is disposed on the first outer surface, and the lower polarizer film is disposed on the second outer surface. The patterned optical compensation films are disposed locally between the upper polarizer film and the lower polarizer film. Fast axis directions of at least two of the patterned optical compensation films are different from each other.

19 Claims, 15 Drawing Sheets

CURVED LIQUID CRYSTAL DISPLAY DEVICE

BACKGROUND

Technical Field

The present invention relates to a curved liquid crystal display device, and in particular, to a curved liquid crystal display device in which a plurality of patterned optical compensation films is disposed locally to compensate for a light leakage phenomenon in some regions caused by a bending stress.

Related Art

With the continuous improvement of liquid crystal display technologies, liquid crystal display panels have been widely applied to flat-screen televisions, notebook computers, mobile phones, and various other consumer electronic products. A conventional liquid crystal display panel is a flat display panel formed by sandwiching a liquid crystal material between an active array substrate and a color filter substrate. In addition, to further improve the viewing effect and the feeling of presence in the scene for viewers, curved displays have been developed in the industry. However, when a liquid crystal display panel is bent or curved, a stress-optical effect is produced on a glass substrate, different stresses are generated in local regions on the glass substrate, and the direction of the maximum principal stress is different from polarizer transmission axis of the display panel. Therefore, phase retardation is caused, and polarized light rays passing through the display panel undergo a slight phase rotation, resulting in light leakage. Due to the uneven stress distribution among the local regions, different local regions have different amounts of phase retardation and different amounts of light leakage, thereby causing a phenomenon of unevenness of overall light leakage (Mura). The Mura is particularly obvious in a dark display state and has serious adverse impacts on the display quality of a curved liquid crystal display.

SUMMARY

An objective of the present invention is to provide a curved (i.e., non-planar) liquid crystal display device in which a plurality of patterned optical compensation films (i.e., retardation film) is disposed locally to improve a light leakage phenomenon caused by a bending stress.

An embodiment of the present invention provides a curved liquid crystal display device, including an upper substrate, a lower substrate, a liquid crystal layer, an upper polarizer film, a lower polarizer film, and a plurality of patterned optical compensation films. The upper substrate has a first inner surface and a first outer surface. The lower substrate is disposed opposite to the upper substrate. The lower substrate has a second inner surface and a second outer surface, and the second inner surface faces the first inner surface of the upper substrate. The liquid crystal layer is sandwiched between the upper substrate and the lower substrate. The upper polarizer film is disposed on the first outer surface of the upper substrate, and the lower polarizer film is disposed on the second outer surface of the lower substrate. The patterned optical compensation films are disposed locally between the upper polarizer film and the lower polarizer film, and fast axis directions of at least two of the patterned optical compensation films are different from each other.

In the curved liquid crystal display device of embodiments of the present invention, patterned optical compensation films having different fast axis directions are disposed in local regions to compensate for a phenomenon of uneven light leakage caused by the uneven stress distribution in the local regions, thereby improving the display quality of the curved liquid crystal display device.

BRIEF DESCRIPTION OF THE DRAWINGS

FIG. 16 is a schematic view of a curved liquid crystal display device according to a fifth embodiment of the present invention.

DETAILED DESCRIPTION

In order to enable persons of ordinary skill in the art to further understand the present invention, the features of the present invention and the effects to be achieved are described in detail below through preferred embodiments of the present invention and with reference to the accompanying drawings.

Figure 1:
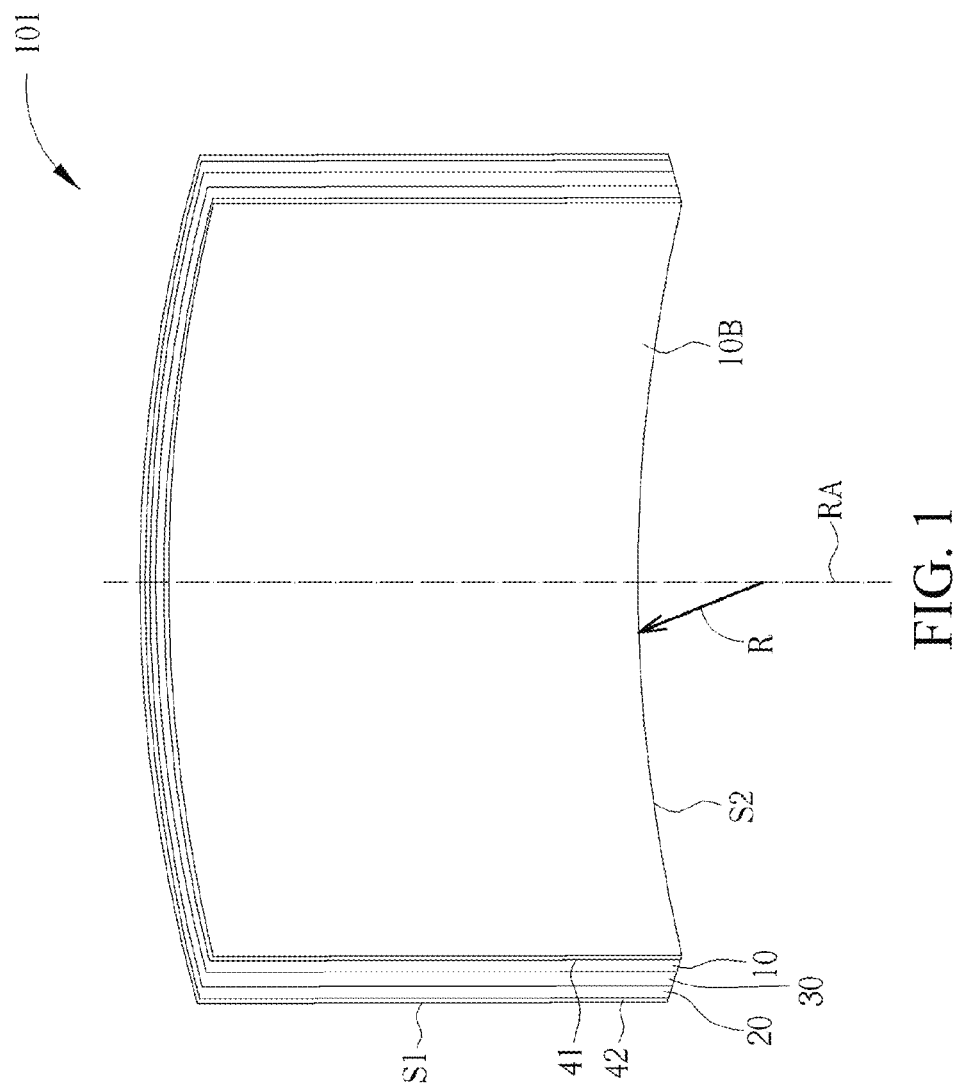
FIG. 1 is a three-dimensional schematic view of a curved liquid crystal display device according to a first embodiment of the present invention.
Figure 2:
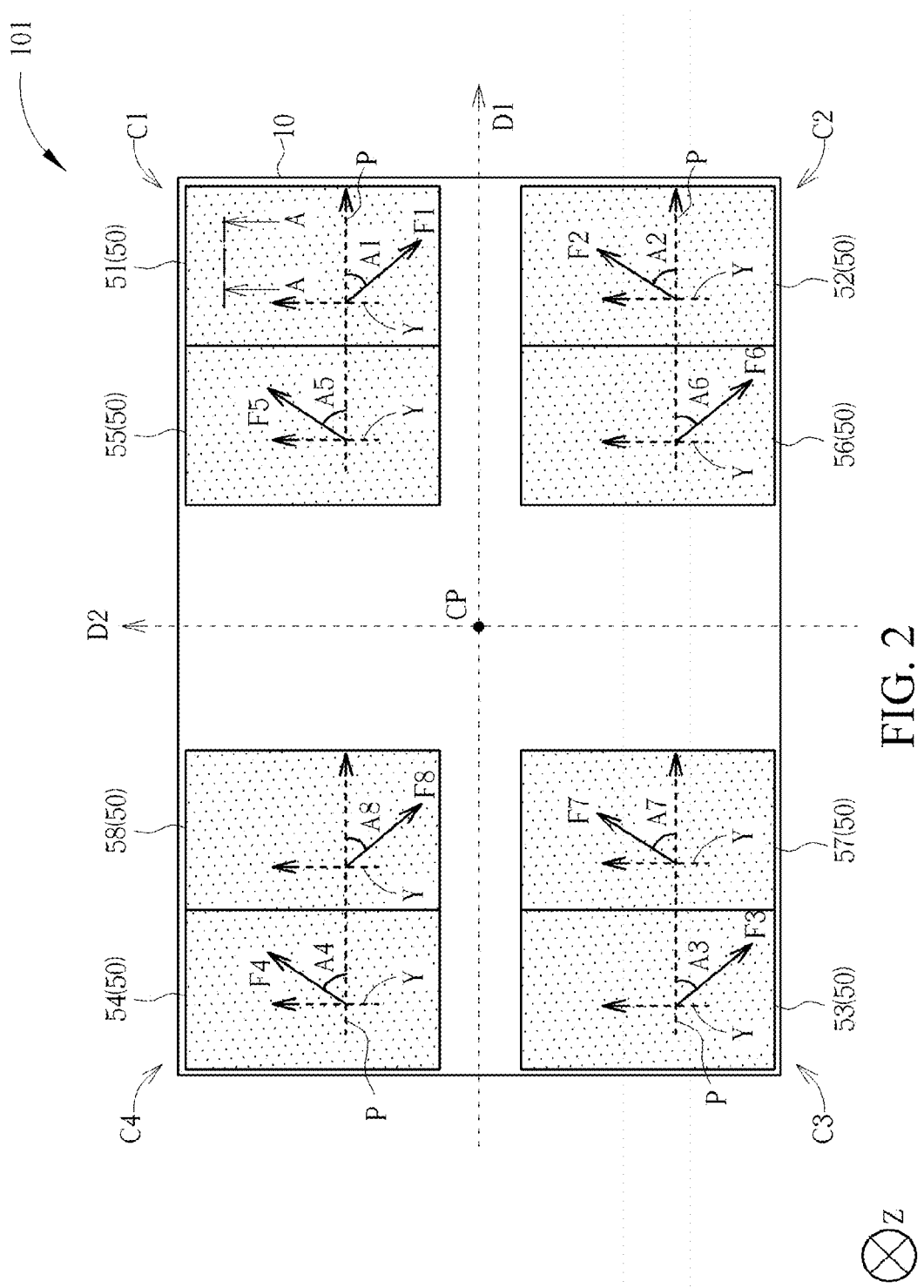
FIG. 2 is a schematic bottom view of the curved liquid crystal display device according to the first embodiment of the present invention.
Figure 3:
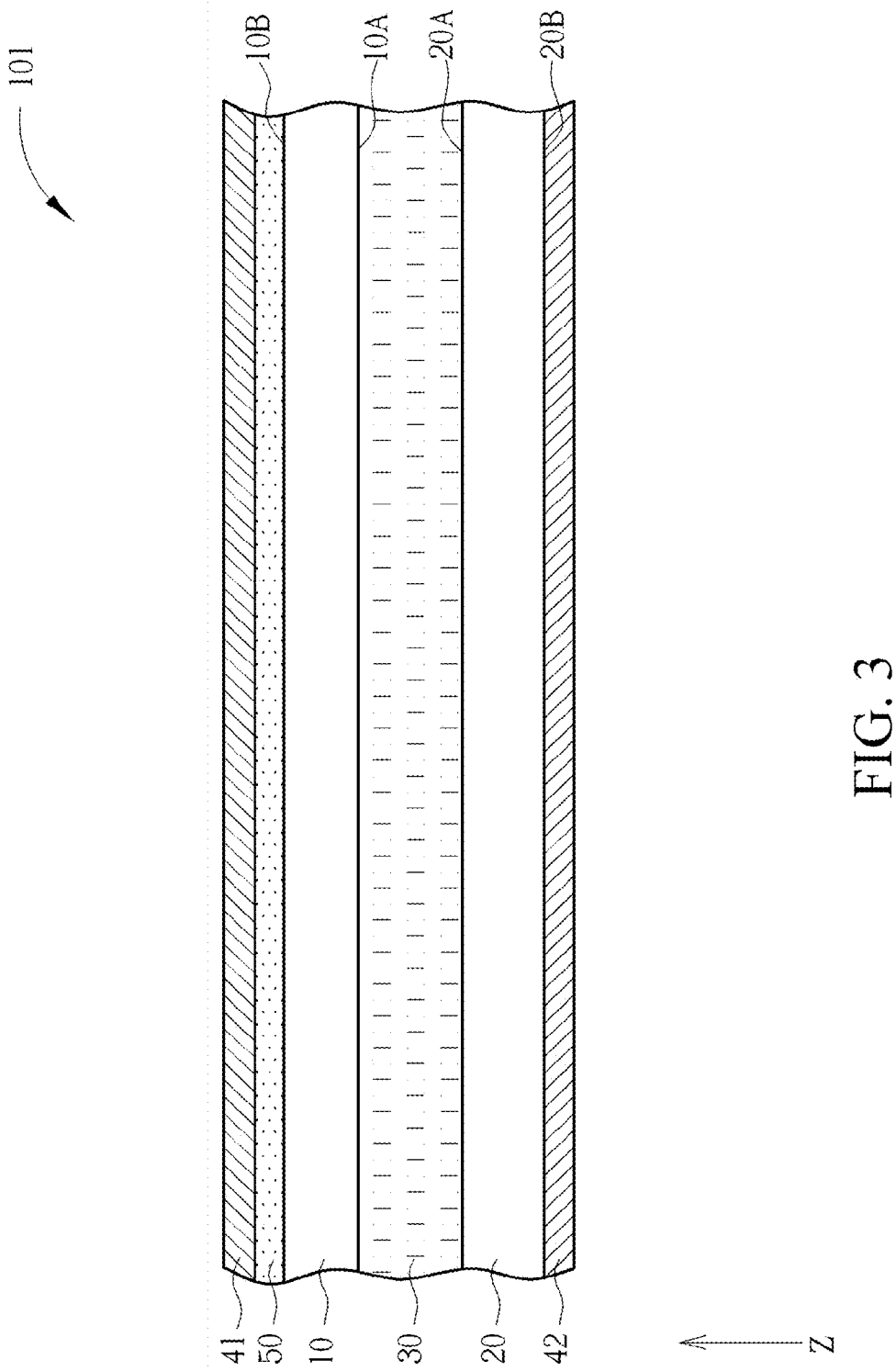
FIG. 3 is a schematic sectional view taken along a section line A-A' in FIG. 2.

Reference is made to FIGS. 1-3. FIG. 1 is a three-dimensional schematic view of a curved liquid crystal display device according to a first embodiment of the present invention, FIG. 2 is a schematic bottom view of the curved liquid crystal display device according to the first embodiment of the present invention, and FIG. 3 is a schematic sectional view taken along a section line A-A' in FIG. 2. For the ease of description, the drawings presented herein are merely exemplary to help understand the present invention, and the specific scale can be adjusted according to design requirements. As shown in FIG. 1 to FIG. 3, a curved liquid crystal display device 101 of this embodiment includes an upper substrate 10, a lower substrate 20, a liquid crystal layer 30, an upper polarizer film 41, a lower polarizer film 42, and a plurality of patterned optical compensation films 50. The upper substrate 10 has a first inner surface 10A and a first outer surface 10B. The lower substrate 20 is disposed opposite to the upper substrate 10. The lower substrate 20 has a second inner surface 20A and a second outer surface 20B, and the second inner surface 20A faces the first inner surface 10A of the upper substrate 10. In this embodiment, at least one of the upper substrate 10 and the lower substrate 20 may include an array substrate, a color filter substrate, a color filter on array (COA) substrate, or any other substrate in a liquid crystal display, and the upper substrate 10 and lower substrate 20 may each include a glass substrate, a plastic substrate, a ceramic substrate, or a substrate made of any other suitable material. In addition, the liquid crystal layer 30 is sandwiched between the upper substrate 10 and the lower substrate 20, and the liquid crystal layer 30 of this embodiment preferably may include vertical alignment (VA) liquid crystals, advanced hyper-viewing angle (AHVA) liquid crystals, in-plane switching (IPS) liquid crystals, or any other suitable type of liquid crystal. The upper polarizer film 41 is disposed on the first outer surface 10B of the upper substrate 10, and the lower polarizer film 42 is disposed on the second outer surface 20B of the lower substrate 20. The patterned optical compensation films 50 are disposed locally between the upper polarizer film 41 and the lower polarizer film 42, and fast axis directions of at least two of the patterned optical compensation films 50 are different from each other.

In this embodiment, the curved liquid crystal display device 101 may be bent around an axial line RA by a curvature radius R. When the first outer surface 10B of the upper substrate 10 of this embodiment is a display side, the curved liquid crystal display device 101 presents a concave state to a viewer, but the present invention is not limited thereto. In other embodiments of the present invention, the curved liquid crystal display device 101 may also present a convex state to the viewer as required. In addition, when the curved liquid crystal display device 101 is a rectangular display device, the extending direction of the axial line RA is parallel to a short side S1 of the curved liquid crystal display device 101, but the present invention is not limited thereto. In other embodiments of the present invention, the extending direction of the axial line RA may also be parallel to a long side S2 of the curved liquid crystal display device 101 as required. When the curved liquid crystal display device 101 is bent, a stress-optical effect is produced on the curved liquid crystal display device 101, different stresses are generated in local regions on the curved liquid crystal display device 101, and the direction of the maximum principal stress is different from the polarizer transmission axis of the upper polarizer film 41 and/or the lower polarizer film 42. Therefore, phase retardation is caused, and polarized light rays passing through the curved liquid crystal display device 101 undergo a slight phase rotation, resulting in light leakage. Due to the uneven stress distribution among the local regions, different local regions have different amounts of phase retardation and different amounts of light leakage, thereby causing a phenomenon of unevenness of overall light leakage (Mura). The plurality of patterned optical compensation films 50 that has different fast axis directions and is disposed locally in the present invention can compensate for different amounts of phase retardation in the local regions on the curved liquid crystal display device 101, thereby alleviating the Mura phenomenon caused by different degrees of light leakage.

In addition, in embodiments of the present invention, the values of different stresses in regions on the curved liquid crystal display device 101 and the angle between the maximum principal stress and the polarizer transmission axis can be estimated according to the degree of bending (for example, the curvature radius), material properties (for example, a stress-optical coefficient, a substrate thickness, and the like), and accordingly, distribution of optical path differences and distribution of fast axis angles can be obtained. For example, in the present invention, light leakage caused by multiple layers of stresses generated by the curved liquid crystal display device 101 can be derived by using a Jones matrix, and eigen values and eigen vectors can be obtained from the Jones matrix equivalent to the multiple layers of stresses, thereby obtaining optical path differences (retardation) and fast axis angles at different position on glass. Accordingly, an optical film that may cause an optical path difference is coated in the fast axis or slow axis direction to reduce or eliminate the optical path difference, thereby solving the problem of uneven light leakage (Mura). The above information can be obtained by performing calculations according to the following relational expressions (1) to (7).

$$\sigma_1 = \frac{\sigma_x + \sigma_y}{2} + \sqrt{\left(\frac{\sigma_x - \sigma_y}{2}\right)^2 + \tau_{xy}^2}, \quad (1)$$

$$\sigma_2 = \frac{\sigma_x + \sigma_y}{2} - \sqrt{\left(\frac{\sigma_x - \sigma_y}{2}\right)^2 + \tau_{xy}^2}, \quad (2)$$

$$\tan 2\theta = \frac{2\tau_{xy}}{\sigma_x - \sigma_y}, \quad (3)$$

$$\Delta n_{1-2} = C \times (\sigma_1 - \sigma_2), \quad (4)$$

$$\delta = \frac{2\pi t}{\lambda} \Delta n_{1-2}, \quad (5)$$

$$M(\theta) = \begin{bmatrix} \cos^2\theta \times e^{i\frac{\delta}{2}} + \sin^2\theta \times e^{-i\frac{\delta}{2}} & 2i \times \sin\theta \times \cos\theta \times \sin\left(\frac{\delta}{2}\right) \\ 2i \times \sin\theta \times \cos\theta \times \sin\left(\frac{\delta}{2}\right) & \sin^2\theta \times e^{i\frac{\delta}{2}} + \cos^2\theta \times e^{-i\frac{\delta}{2}} \end{bmatrix}, \text{ and} \quad (6)$$

$$\text{Lightleak} = (\text{ABS}(J_x^T M_4 M_3 M_2 M_1 J_y))^2. \quad (7)$$

In the above relational expressions, $\sigma_1$ represents a maximum principal stress, $\sigma_2$ represents a minimum principal stress, $\theta$ represents an angle of the maximum principal stress, $\sigma_x$ represents an x-axis stress, $\sigma_y$ represents a y-axis stress, $\tau_{xy}$ represents a shear stress, $\delta$ represents an amount of phase retardation, C represents a stress-optical coefficient, t represents a substrate thickness, $M_1$, $M_2$, $M_3$, and $M_4$ respectively represent matrices corresponding to a total of four layers when the upper substrate 10 and lower substrate 20 are each divided into an upper layer and a lower layer, and $J_x$ and $J_y$ represent Jones vectors for linear polarizer films. In addition, for different sizes, different substrate thicknesses and different curvature radii, a regression analysis is performed on a maximum optical path difference formed by a stress caused by a curved surface, and the following relational expression (8) can be obtained.

$$\text{Retardation} = 24266*(t/0.5)^{2}*(C/3.3e^{-6})*R^{-1.054} \qquad (8).$$

In the relational expression (8), Retardation represents an optical path difference (measured in nanometers (nm)), t represents a substrate thickness (measured in millimeters (mm)), C represents a stress-optical coefficient (measured in $MPa^{-1}$), and R represents a curvature radius (measured in millimeters (mm)). An optical path difference caused by bending can be estimated by using the relational expression (8), and the optical compensation property of a corresponding patterned optical compensation film 50 can be selected and controlled according to the result of estimation. It should be noted that because distributions of optical path differences in adjacent regions on the curved liquid crystal display device 101 are slightly different in fact, a compensation optical path difference required by the corresponding patterned optical compensation film 50 is preferably selected and controlled according to a range of 1.5 to 0.5 times the optical path difference calculated according to the relational expression (8). In other words, the optical path difference of each of the patterned optical compensation films 50 is preferably 0.5 to 1.5 times a maximum optical path difference of a light leakage region corresponding to the patterned optical compensation film 50. In addition, besides the foregoing estimation manner, it is also feasible to measure actual light leakage status of the curved liquid crystal display device and then determine how to select a patterned optical compensation film 50 having a suitable optical compensation property, and the patterned optical compensation film 50 of the present invention may be formed by coating, adhesion, or any other suitable method as required. The material of the patterned optical compensation films 50 may include a liquid crystal material or any other suitable material having a birefringence property. When the patterned optical compensation films 50 are made of a liquid crystal material, a fast axis direction of each of the patterned optical compensation films 50 may be controlled by a coating direction.

As is known by persons skilled in the art, waveplates are constructed out of a birefringent material (such as quartz or mica), for which the index of refraction is different for different orientations of light passing through it. A waveplate operates by shifting the phase between two perpendicular polarization components of the light wave. A typical waveplate is simply a birefringent crystal with a carefully chosen orientation and thickness. The crystal may be cut into a plate, with the orientation of the cut chosen so that the optic axis of the crystal is parallel to the surfaces of the plate. This results in two axes in the plane of the cut: an ordinary axis, with a first index of refraction, and an extraordinary axis, with a second index of refraction$_e$. The ordinary axis is perpendicular to the optic axis, and the extraordinary axis is parallel to the optic axis. For a light wave normally incident upon the plate, the polarization component along the ordinary axis travels through the crystal with a speed that is different than the speed of the polarization component along the extraordinary axis (which results in a phase difference between the two components as they exit the crystal). As used herein, the "fast axis" direction is extraordinary axis direction, and the slow axis direction is the ordinary axis direction.

Furthermore, the curved liquid crystal display device 101 of this embodiment may include a first corner C1, a second corner C2, a third corner C3, and a fourth corner C4 that are arranged in a clockwise direction, and the patterned optical compensation films 50 may include a first patterned optical compensation film 51, a second patterned optical compensation film 52, a third patterned optical compensation film 53, and a fourth patterned optical compensation film 54 that are respectively disposed at the first corner C1, the second corner C2, the third corner C3, and the fourth corner C4. The patterned optical compensation films 50 do not overlap each other in a vertical projection direction Z. In addition, a fast axis direction of the first patterned optical compensation film 51 is different from a fast axis direction of the second patterned optical compensation film 52, the fast axis direction of the first patterned optical compensation film 51 is different from a fast axis direction of the fourth patterned optical compensation film 54, and the fast axis direction of the first patterned optical compensation film 51 may be substantially the same as a fast axis direction of the third patterned optical compensation film 53, but the present invention is not limited thereto. In other words, if an axial direction extending from a center point CP of the curved liquid crystal display device 101 in a direction parallel to a long side S2 is defined as a first direction axis D1 and an axial direction extending from the center point CP of the curved liquid crystal display device 101 in a direction parallel to a short side S1 is defined as a second direction axis D2, in four quadrants defined by the first direction axis D1 and the second direction axis D2 that are orthogonal to each other, the first patterned optical compensation film 51, the second patterned optical compensation film 52, the third patterned optical compensation film 53, and the fourth patterned optical compensation film 54 are respectively disposed in a first quadrant, a fourth quadrant, a third quadrant, and a second quadrant. The first patterned optical compensation film 51 located in the first quadrant and the third patterned optical compensation film 53 located in the third quadrant may have similar fast axis directions, and the fourth patterned optical compensation film 54 located in the second quadrant and the second patterned optical compensation film 52 located in the fourth quadrant may have similar fast axis directions.

In addition, the patterned optical compensation films 50 of this embodiment may further include a fifth patterned optical compensation film 55, a sixth patterned optical compensation film 56, a seventh patterned optical compensation film 57, and an eighth patterned optical compensation film 58 that are respectively disposed adjacent to the first patterned optical compensation film 51, the second patterned optical compensation film 52, the third patterned optical compensation film 53, and the fourth patterned optical compensation film 54. To be specific, the fifth patterned optical compensation film 55 is disposed adjacent to the corresponding first patterned optical compensation film 51 in a direction parallel to the first direction axis D1, the sixth patterned optical compensation film 56 is disposed adjacent to the corresponding second patterned optical compensation film 52 in a direction parallel to the first direction axis D1, the seventh patterned optical compensation film 57 is disposed adjacent to the corresponding third patterned optical compensation film 53 in a direction parallel to the first direction axis D1, the fifth patterned optical compensation film 55 is disposed adjacent to the first patterned optical compensation film 51 in a direction parallel to the first direction axis D1, and the eighth patterned optical compensation film 58 is disposed adjacent to the corresponding fourth patterned optical compensation film 54 in a direction parallel to the first direction axis D1. In addition, the fifth patterned optical compensation film 55, the sixth patterned optical compensation film 56, the seventh patterned optical compensation film 57, and the eighth patterned optical compensation film 58 are disposed closer to the center point CP than the corresponding first patterned optical compensation film 51, second patterned optical compensation film 52, third patterned optical compensation film 53, and fourth patterned optical compensation film 54. In other words, in the four quadrants defined by the first direction axis D1 and the second direction axis D2, the first patterned optical compensation film 51 and the fifth patterned optical compensation film 55 are disposed in the first quadrant, the second patterned optical compensation film 52 and the sixth patterned optical compensation film 56 are disposed in the fourth quadrant, the third patterned optical compensation film 53 and the seventh patterned optical compensation film 57 are disposed in the third quadrant, and the fourth patterned optical compensation film 54 and the eighth patterned optical compensation film 58 are disposed in the third quadrant. In addition, the fast axis direction of the first patterned optical compensation film 51 is different from a fast axis direction of the fifth patterned optical compensation film 55 disposed adjacent thereto, the fast axis direction of the second patterned optical compensation film 52 is different from a fast axis direction of the sixth patterned optical compensation film 56 disposed adjacent thereto, the fast axis direction of the third patterned optical compensation film 53 is different from a fast axis direction of the seventh patterned optical compensation film 57 disposed adjacent thereto, and the fast axis direction of the fourth patterned optical compensation film 54 is different from a fast axis direction of the eighth patterned optical compensation film 58 disposed adjacent thereto.

For example, when the upper polarizer film 41 has a transmission axis direction P, the first patterned optical compensation film 51 has a first fast axis direction F1, the second patterned optical compensation film 52 has a second fast axis direction F2, the third patterned optical compensation film 53 has a third fast axis direction F3, the fourth patterned optical compensation film 54 has a fourth fast axis direction F4, the fifth patterned optical compensation film 55 has a fifth fast axis direction F5, the sixth patterned optical compensation film 56 has a sixth fast axis direction F6, the seventh patterned optical compensation film 57 has a seventh fast axis direction F7, and the eighth patterned optical compensation film 58 has an eighth fast axis direction F8. A first angle A1 exists between the first fast axis direction F1 and the transmission axis direction P, a second angle A2 exists between the second fast axis direction F2 and the transmission axis direction P, a third angle A3 exists between the third fast axis direction F3 and the transmission axis direction P, a third angle A3 exists between the third fast axis direction F3 and the transmission axis direction P, a fourth angle A4 exists between the fourth fast axis direction F4 and the transmission axis direction P, a fifth angle A5 exists between the fifth fast axis direction F5 and the transmission axis direction P, a sixth angle A6 exists between the sixth fast axis direction F6 and the transmission axis direction P, a seventh angle A7 exists between the seventh fast axis direction F7 and the transmission axis direction P, and an eighth angle A8 exists between the eighth fast axis direction F8 and the transmission axis direction P. If the angles between the fast axis directions and the transmission axis direction P are defined to be positive values in a counterclockwise direction and negative values in a clockwise direction, the first angle A1 is different from the fifth angle A5, the second angle A2 is different from the sixth angle A6, the third angle A3 is different from the seventh angle A7, and the fourth angle A4 is different from the eighth angle A8.

However, the present invention is not limited thereto. Another four quadrants may be defined by the transmission axis direction P and an orthogonal direction Y orthogonal to the transmission axis direction P; in this case, the first angle A1 and the third angle A3 are located in a same quadrant, the second angle A2 and the fourth angle A4 are located in a same quadrant, the fifth angle A5 and the seventh angle A7 are located in a same quadrant, and the sixth angle A6 and the eighth angle A8 are located in a same quadrant. The orthogonal direction Y may pass through the intersection point between the angles and the transmission axis direction P to form the forgoing four quadrants. In addition, an absolute value of the first angle A1 may be the same as an absolute value of the third angle A3, an absolute value of the second angle A2 may be the same as an absolute value of the fourth angle A4, an absolute value of the fifth angle A5 may be the same as an absolute value of the seventh angle A7, and an absolute value of the sixth angle A6 may be the same as an absolute value of the eighth angle A8; however, the present invention is not limited thereto. In addition, when the corresponding patterned optical compensation film 50 causes a positive optical path difference, the first angle A1, the third angle A3, the sixth angle A6, and the eighth angle A8 are preferably 0 to 90 degrees or 90 to 180 degrees, and the second angle A2, the fourth angle A4, the fifth angle A5, and the seventh angle A7 are preferably 0 to −90 degrees or 180 to 270 degrees; in contrast, when the corresponding patterned optical compensation film 50 causes a negative optical path difference, the first angle A1, the third angle A3, the sixth angle A6, and the eighth angle A8 are preferably 0 to 90 degrees or 180 to 270 degrees, and the second angle A2, the fourth angle A4, the fifth angle A5, and the seventh angle A7 are preferably 0 to −90 degrees or 90 to 180 degrees; however, the present invention is not limited thereto. In addition, in this embodiment, when the transmission axis direction P is used as a symmetry axis, the first fast axis direction F1 may be symmetric to the fourth fast axis direction F4 and the fifth fast axis direction F5, the second fast axis direction F2 may be symmetric to the third fast axis direction F3 and the sixth fast axis direction F6, the third fast axis direction F3 may be symmetric to the seventh fast axis direction F7, and the fourth fast axis direction F4 may be symmetric to the eighth fast axis direction F8.

As shown in FIG. 3, the patterned optical compensation films 50 of this embodiment are disposed between the upper substrate 10 and the upper polarizer film 41. That is, the patterned optical compensation films 50 may be formed on the first outer surface 10B of the upper substrate 10 first, followed by the formation of the upper polarizer film 41. It should be noted that positions for disposing the patterned optical compensation films 50 of the present invention are not limited to the foregoing manner, and in other embodiments of the present invention, the patterned optical compensation films 50 may be disposed on the first inner surface 10A of the upper substrate 10, the second inner surface 20A of the lower substrate 20, or the second outer surface 20B of the lower substrate 20 as required. In addition, the patterned optical compensation films 50 may also be disposed on different surfaces as required.

As shown in FIG. 2, the patterned optical compensation films 50 are disposed locally in the curved liquid crystal display device 101 only in the vertical projection direction Z, that is, some regions in the curved liquid crystal display device 101, for example, the central region that is less likely to experience light leakage caused by bending, are not provided with any patterned optical compensation film 50, so as to avoid adverse effects that might be caused when the patterned optical compensation films 50 are disposed globally. In other words, a gap exists between at least two of the patterned optical compensation films 50, and the patterned optical compensation films 50 are not disposed globally in the curved liquid crystal display device 101.

Figure 4:
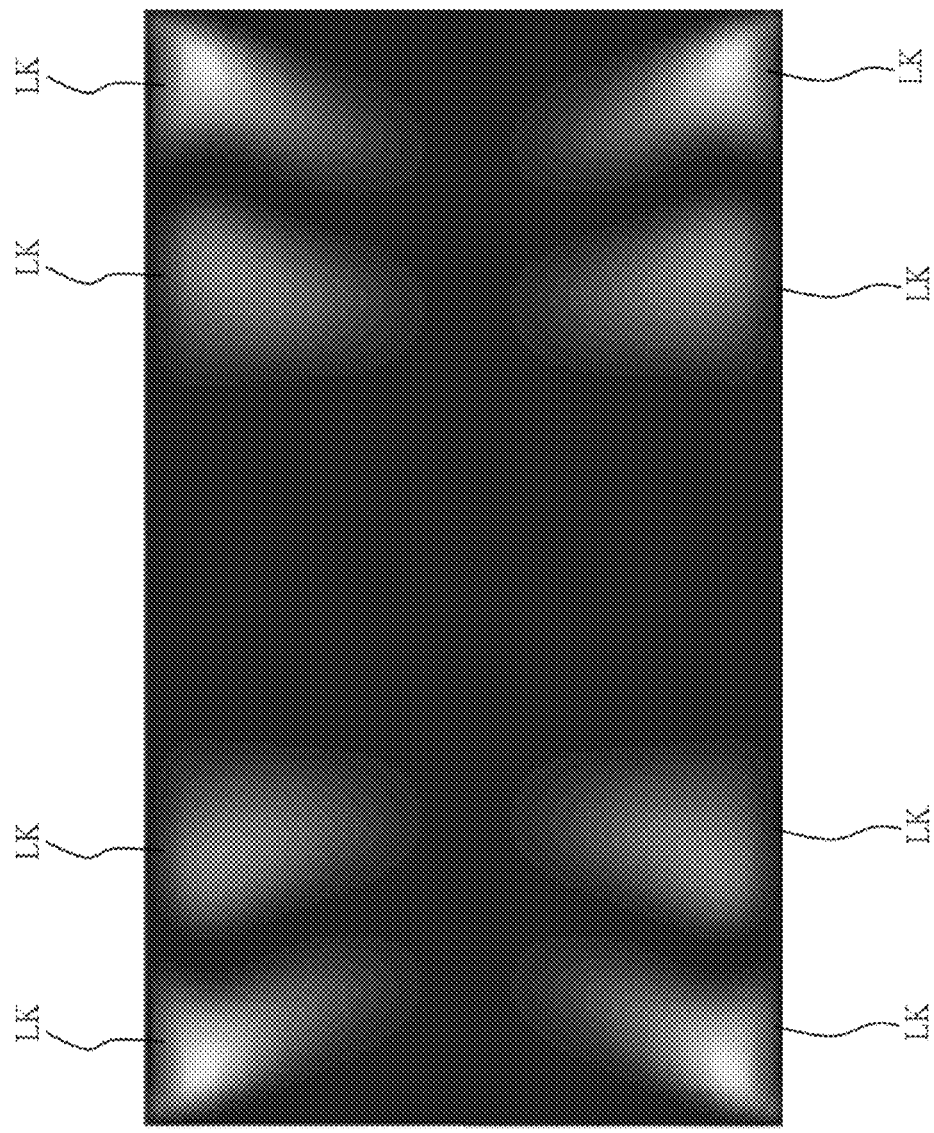
FIG. 4 is a schematic view illustrating light leakage when the curved liquid crystal display device of the first embodiment of the present invention is not provided with any patterned optical compensation film.
Figure 5:
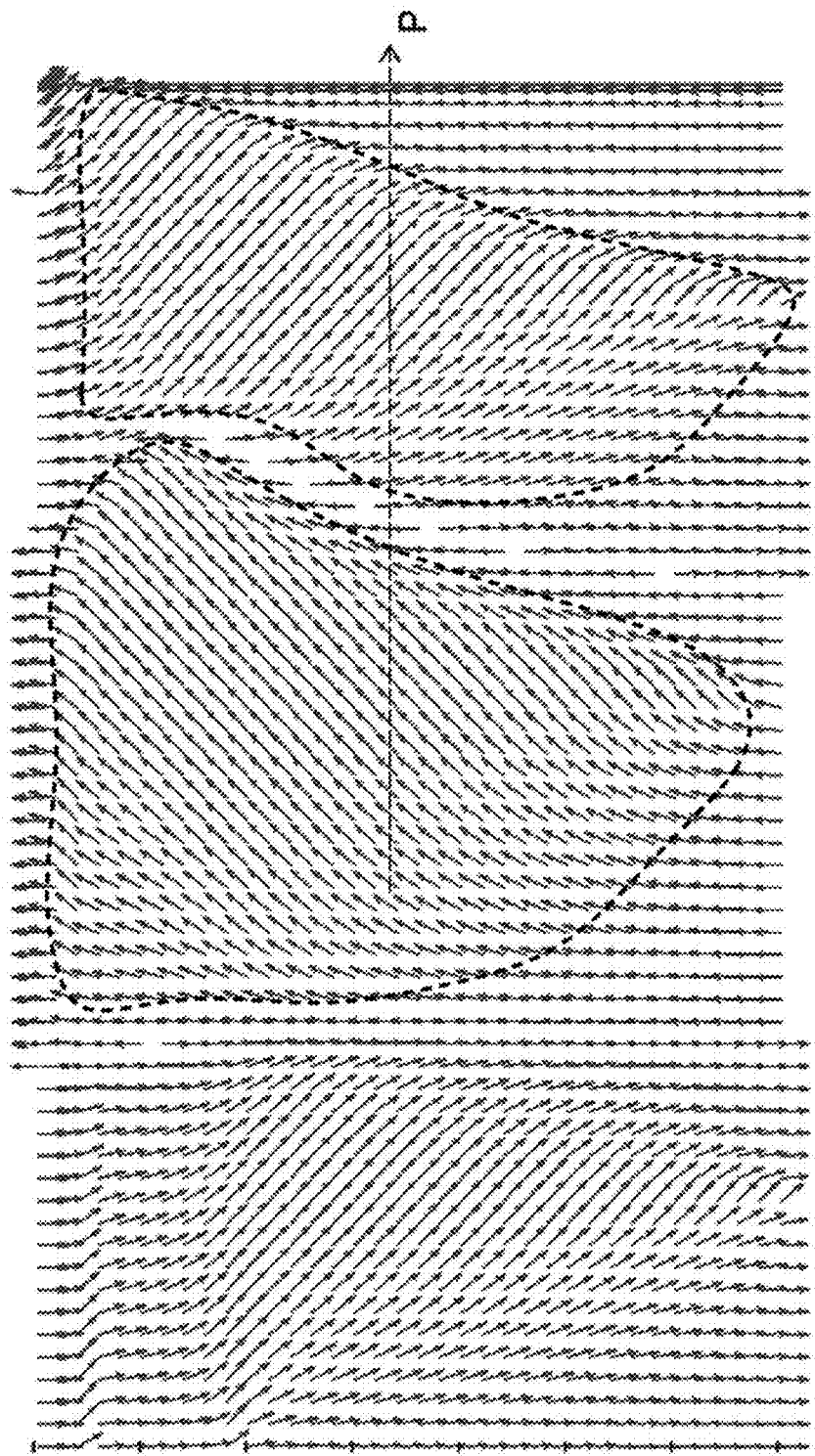
FIG. 5 is a schematic view illustrating fast axis direction distribution when an optical birefringence phenomenon occurs at a first corner of the curved liquid crystal display device of the first embodiment of the present invention due to a stress.
Figure 6:
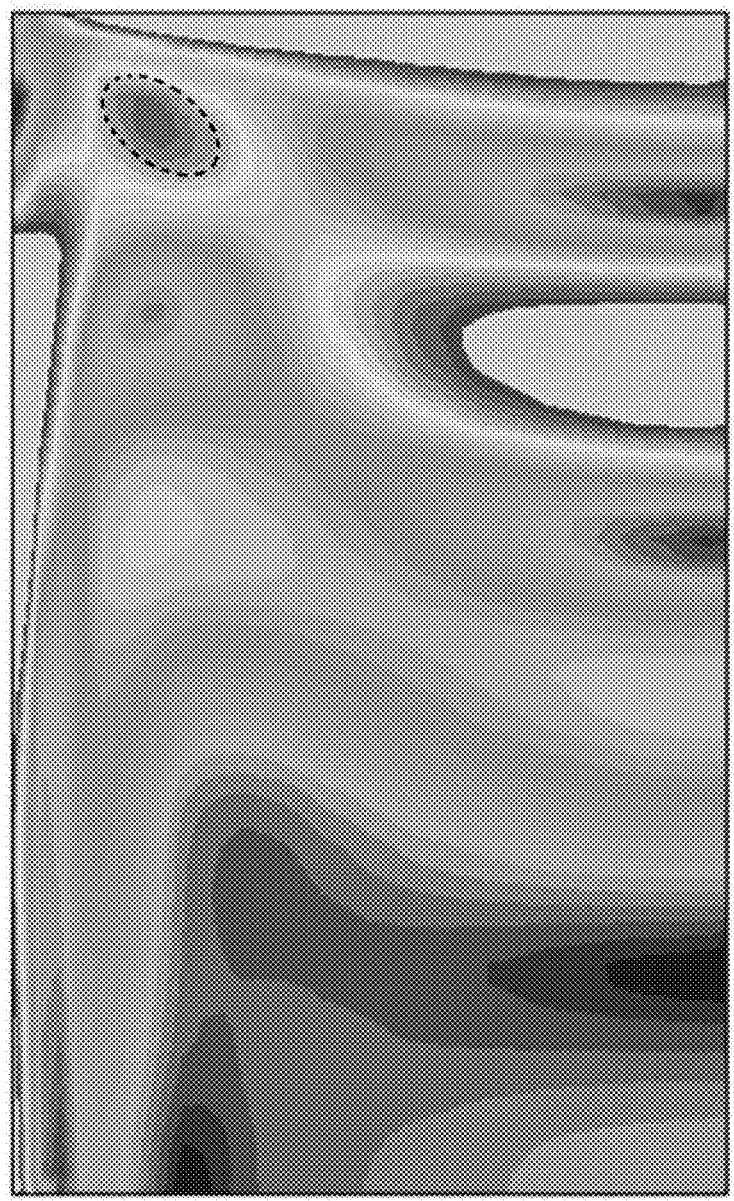
FIG. 6 and FIG. 7 are schematic views illustrating optical path difference distribution at a first corner when the curved liquid crystal display device according to the first embodiment of the present invention is bent to different degrees and is not provided with any patterned optical compensation film.
Figure 7:
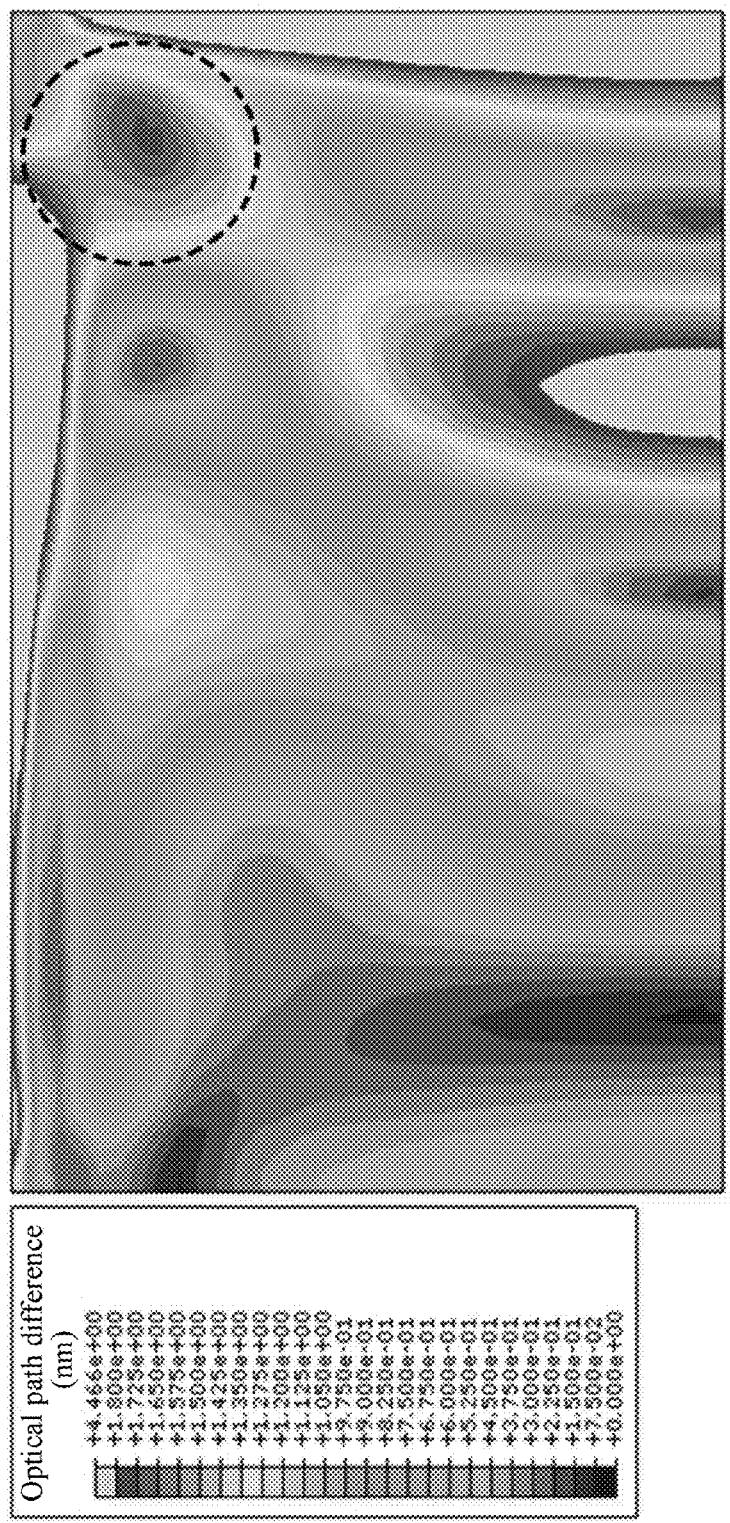
Figure 8:
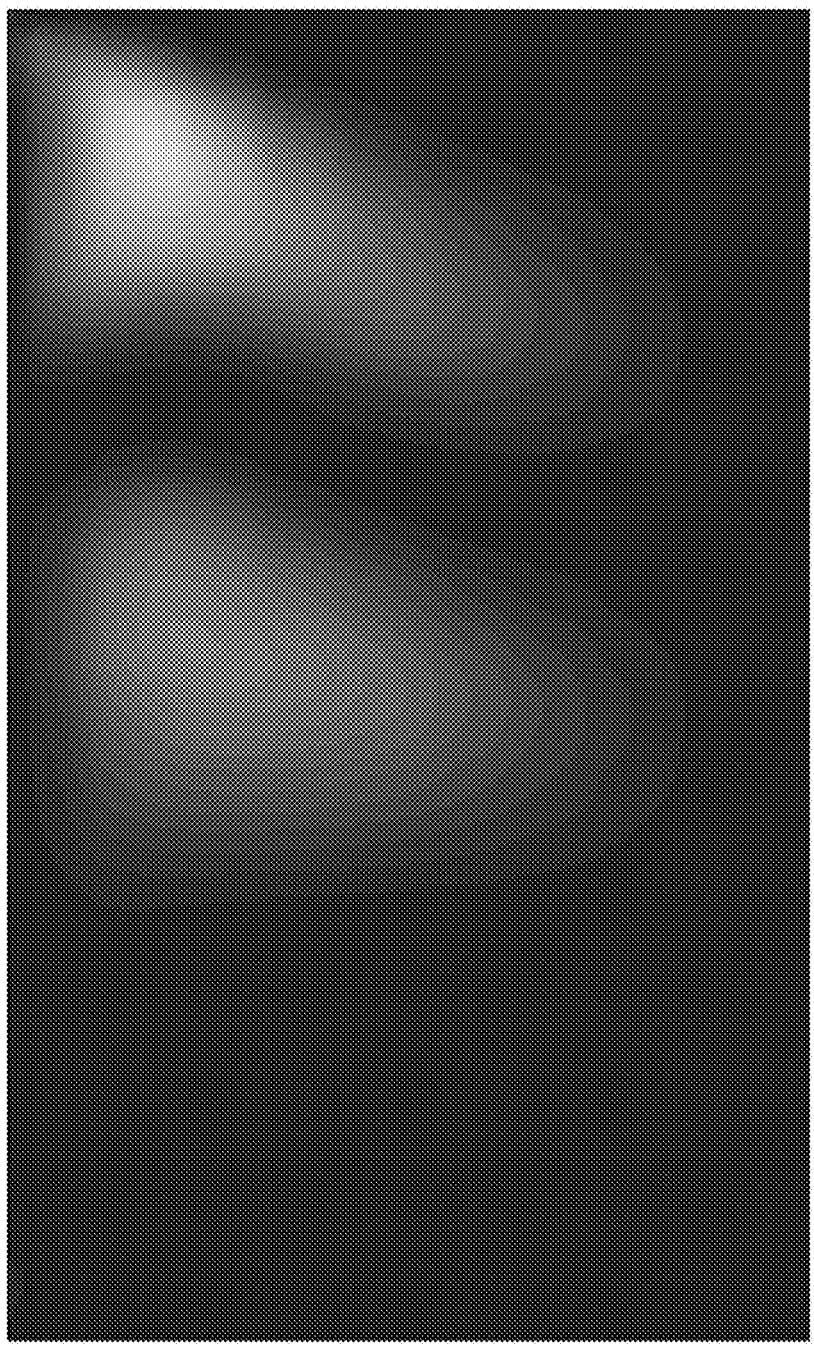
FIG. 8 is a schematic view illustrating light leakage at a first corner when the curved liquid crystal display device of the first embodiment of the present invention is not provided with any patterned optical compensation film.

The effects of the patterned optical compensation films 50 of this embodiment are described below with reference to FIG. 2, as well as FIG. 4 to FIG. 12. FIG. 4 is a schematic view illustrating light leakage when the curved liquid crystal display device 101 of this embodiment is not provided with any patterned optical compensation film 50, FIG. 5 is a schematic view illustrating fast axis direction distribution when an optical birefringence phenomenon occurs at the first corner C1 of the curved liquid crystal display device 101 due to a stress, FIG. 6 and FIG. 7 are schematic views illustrating optical path difference distribution at the first corner C1 when the curved liquid crystal display device 101 is bent to different degrees and is not provided with any patterned optical compensation film 50, FIG. 8 is a schematic view illustrating light leakage at the first corner C1 when the curved liquid crystal display device 101 is not provided with any patterned optical compensation film 50, and FIG. 9 to FIG. 12 are schematic views illustrating light leakage at the first corner C1 when patterned optical compensation films 50 having different optical path differences are disposed in combination in the curved liquid crystal display device 101. As shown in FIG. 2 and FIG. 4, there are two light leakage regions LK at each of the four corners of the curved liquid crystal display device 101, and each of the patterned optical compensation films 50 is disposed corresponding to the position of each of the light leakage regions LK. The curved liquid crystal display device of FIG. 4 and FIG. 5 is a 65-inch display having a substrate thickness of 0.5 mm and a curvature radius of 4,200 mm.

As shown in FIG. 5 and FIG. 2, by using the first corner C1 as an example, fast axis directions of liquid crystal molecules in regions with severe light leakage (for example, regions surrounded by dashed lines in FIG. 5) substantially form an angle of about 45 degrees with the transmission axis direction P, and therefore, the fast axis direction of the corresponding patterned optical compensation film 50 is preferably consistent with a fast axis direction when an optical birefringence phenomenon occurs in the light leakage region due to a stress, thereby achieving a desirable compensation effect; however, the present invention is not limited thereto. It should be noted that, in the case of different curvatures, fast axis angles of light leakage positions are quite consistent (as shown in FIG. 5), and the angles between the fast axis directions of the regions with severe light leakage and the transmission axis direction P are all close to positive or negative 45 degrees.

Figure 9:
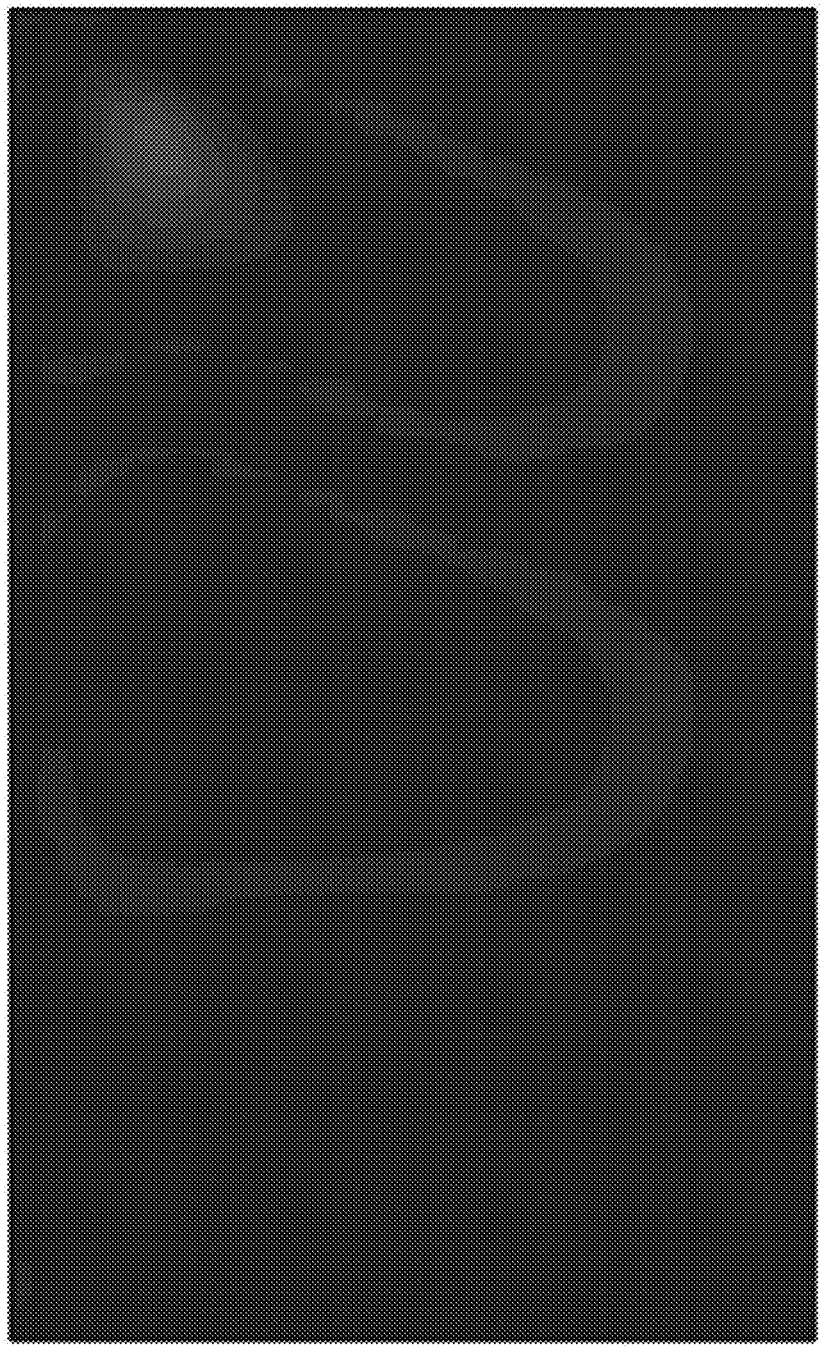
FIG. 9 to FIG. 12 are schematic views illustrating light leakage at a first corner when patterned optical compensation films having different optical path differences are disposed in combination in the curved liquid crystal display device of the first embodiment of the present invention.
Figure 10:
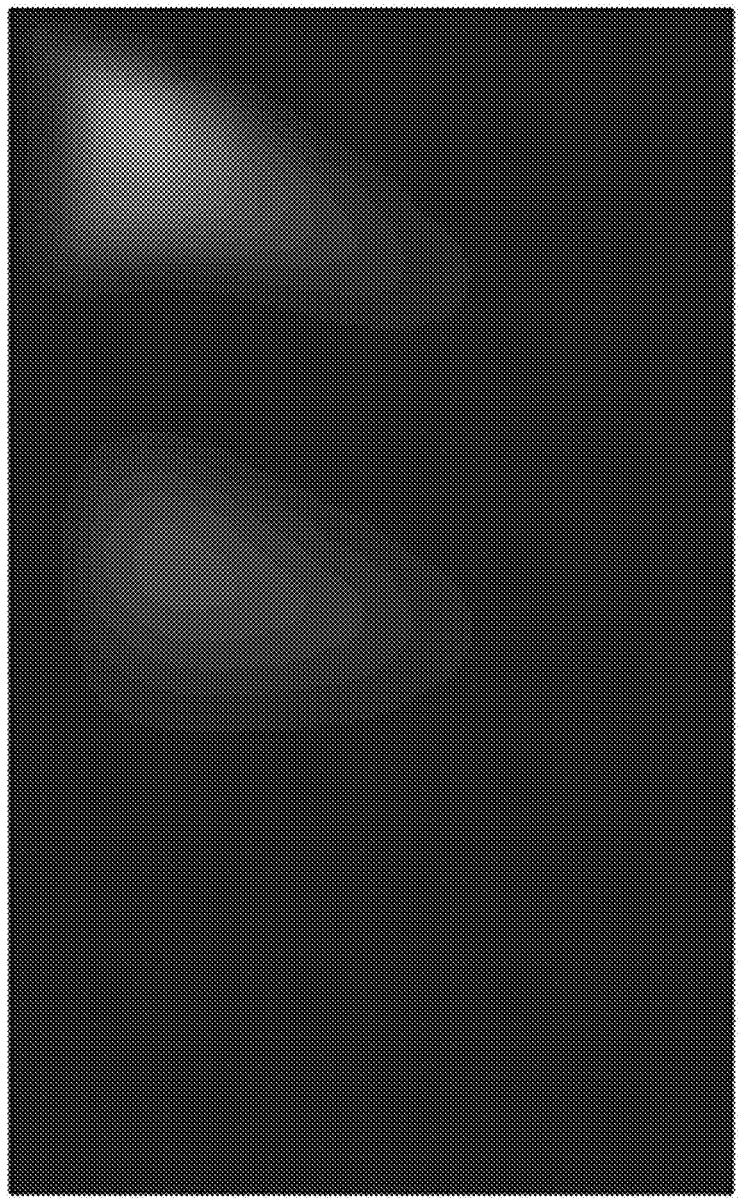
Figure 11:
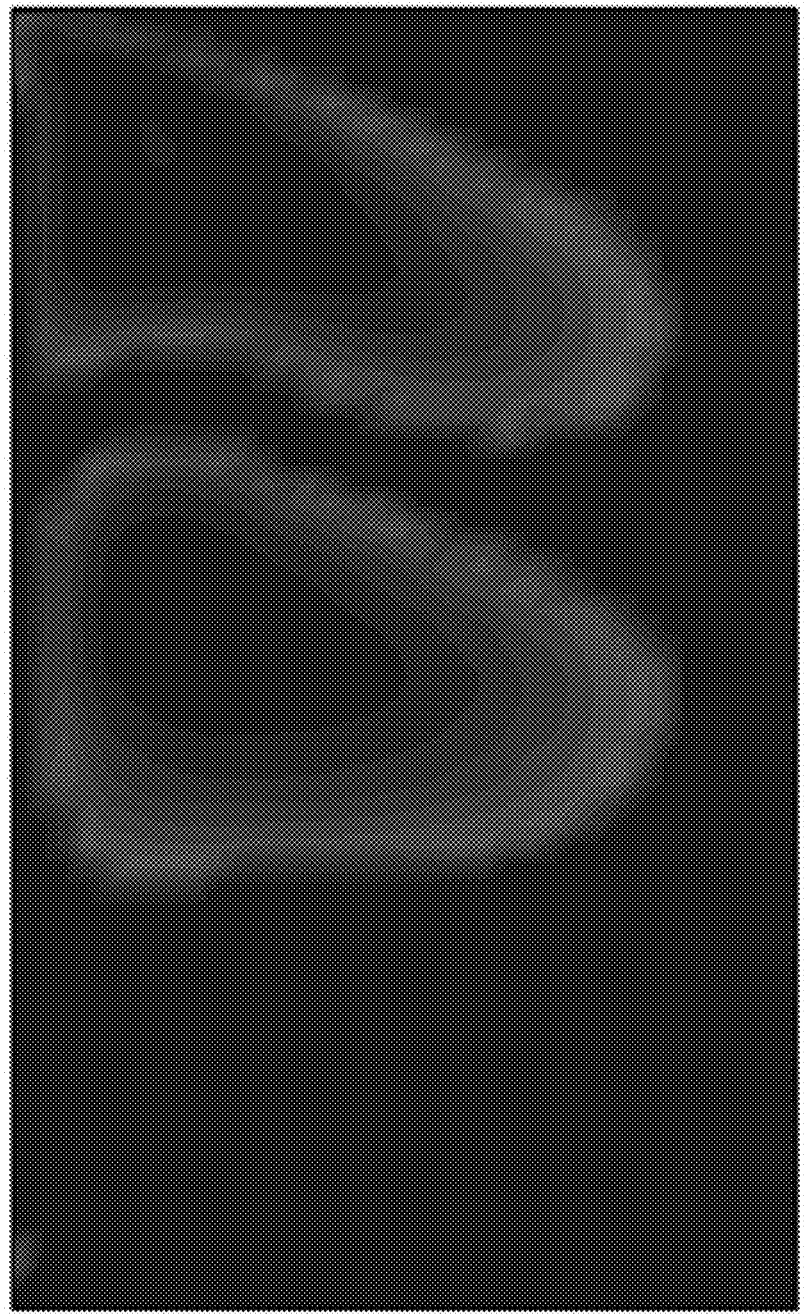
Figure 12:
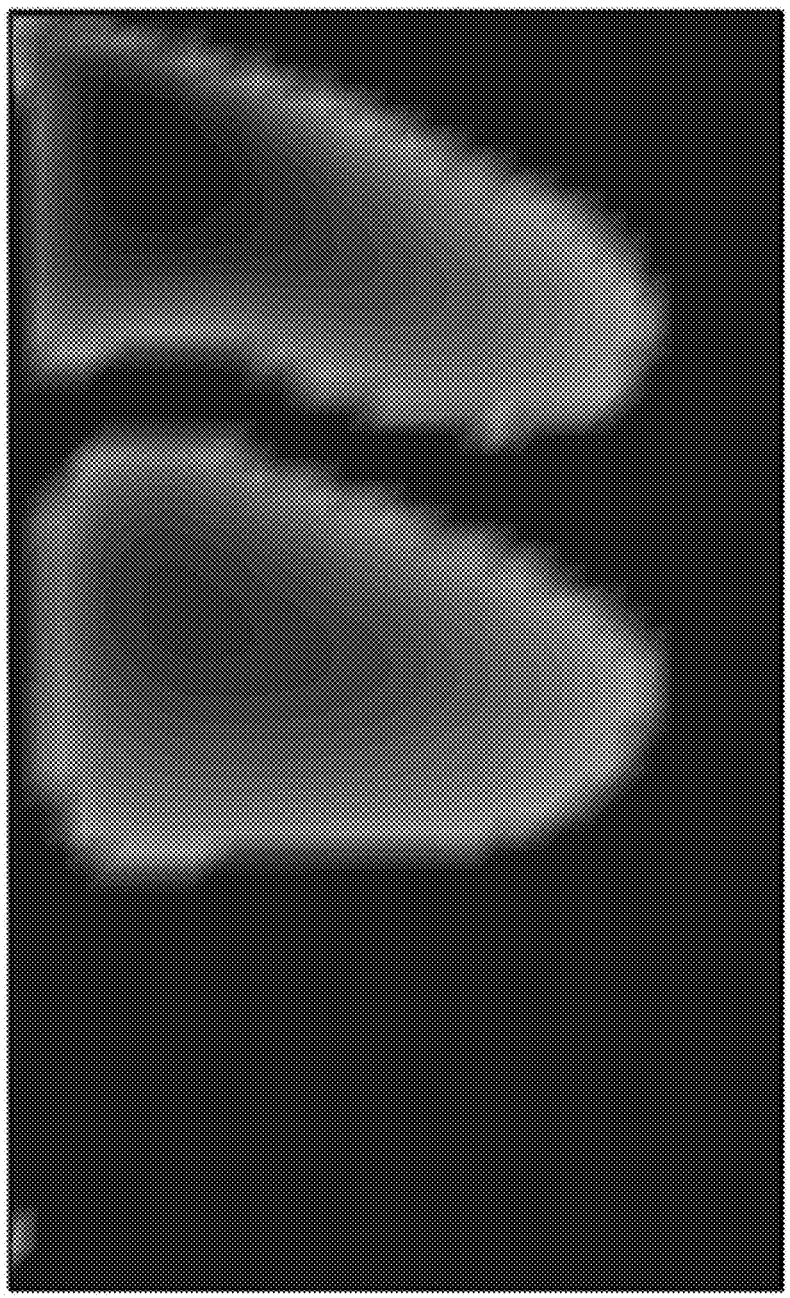

As shown in FIG. 6, FIG. 7, and FIG. 2, the optical difference distribution varies with the degree of bending. FIG. 6 shows that when a 65-inch display having a substrate thickness of 0.5 mm has a curvature radius of 3,000 mm, a maximum optical path difference is about 2.6 nm (within the region surrounded by a dashed line in FIG. 6), and FIG. 7 shows that when a 65-inch display having a substrate thickness of 0.5 mm has a curvature radius of 4,200 mm, a maximum optical path difference is about 1.8 nm (within the region surrounded by a dashed line in FIG. 7). Because optical path difference distributions in light leakage regions are not the same in fact, an optical path difference of a patterned optical compensation film 50 may preferably be 1.5 to 0.5 times an optical path difference of a light leakage region corresponding to the patterned optical compensation film 50. For example, FIG. 9 to FIG. 12 show light leakage of a 55-inch display having a substrate thickness of 0.5 mm when the curvature radius is 4,200 mm and patterned optical compensation films having different optical path differences are disposed in combination. FIG. 9 shows a reduction in light leakage when a first patterned optical compensation film 51 having a first angle A1 of −45 degrees and an optical path difference of 1.8 nm (that is, equal to the maximum optical path difference of the corresponding light leakage region) and a fifth patterned optical compensation film 55 having a fifth angle A5 of 45 degrees and an optical path difference of 1.8 nm are disposed in combination, FIG. 10 shows a reduction in light leakage when a first patterned optical compensation film 51 having a first angle A1 of −45 degrees and an optical path difference of 0.9 nm (that is, equal to 0.5 times the maximum optical path difference of the corresponding light leakage region) and a fifth patterned optical compensation film 55 having a fifth angle A5 of 45 degrees and an optical path difference of 0.9 nm are disposed in combination, FIG. 11 shows a reduction in light leakage when a first patterned optical compensation film 51 having a first angle A1 of −45 degrees and an optical path difference of 2.7 nm (that is, equal to 1.5 times the maximum optical path difference of the corresponding light leakage region) and a fifth patterned optical compensation film 55 having a fifth angle A5 of 45 degrees and an optical path difference of 2.7 nm are disposed in combination, and FIG. 12 shows a reduction in light leakage when a first patterned optical compensation film 51 having a first angle A1 of −45 degrees and an optical path difference of 3.6 nm (that is, equal to 2 times the maximum optical path difference of the corresponding light leakage region) and a fifth patterned optical compensation film 55 having a fifth angle A5 of 45 degrees and an optical path difference of 2.7 nm are disposed in combination. Upon comparison with the light leakage at the first corner C1 when no patterned optical compensation film 50 is disposed in FIG. 8, it can be known that when patterned optical compensation films having corresponding fast axis directions and suitable optical path differences are disposed in combination, the original light leakage phenomenon can be alleviated. For example, the degree of light leakage can be reduced by about 77% in FIG. 9, and the degree of light leakage can be reduced by about 71% in FIG. 11. However, in FIG. 12, although a greater optical path difference (3.6 nm, which is 2 times the maximum optical path difference of the corresponding light leakage region) is compensated for, the degree of light leakage is reduced only by about 33%, and the light leakage region moves to the inner side, making the quality lower than that where no coating is used. Therefore, a desirable compensation effect can be achieved when the optical path difference of each of the patterned optical compensation films 50 is 0.5 to 1.5 times the optical path difference of the light leakage region corresponding to the patterned optical compensation film 50.

Different embodiments of the present invention will be described below. For the brevity of description, mainly the differences between the embodiments are detailed below, and similar features among different embodiments will not be described repeatedly. In addition, similar features in the embodiments of the present invention are denoted by same reference signs for ready cross reference among the embodiments.

Figure 13:
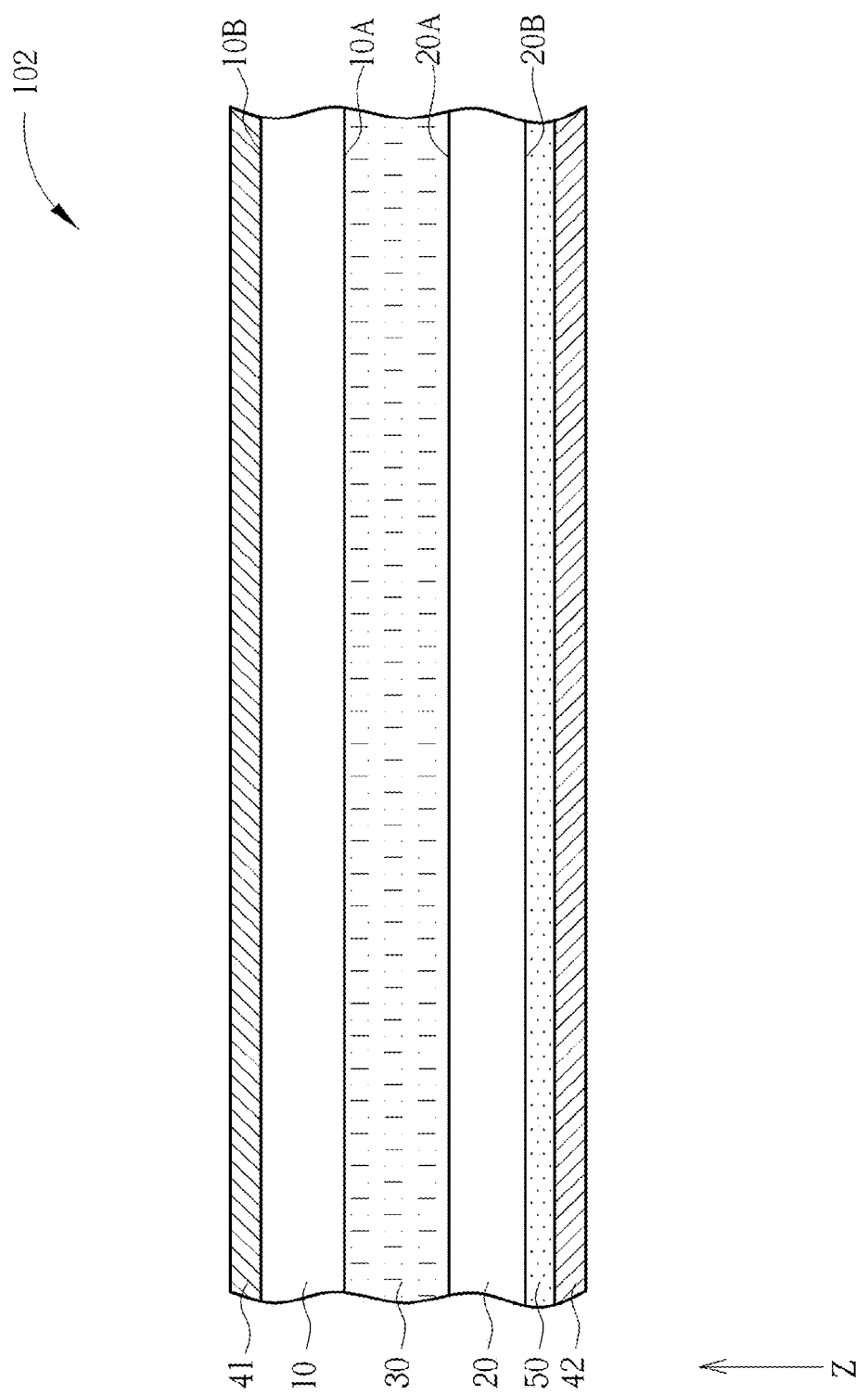
FIG. 13 is a schematic view of a curved liquid crystal display device according to a second embodiment of the present invention.

Reference is now made to FIG. 13. FIG. 13 is a schematic view of a curved liquid crystal display device according to a second embodiment of the present invention. As shown in FIG. 13, this embodiment differs from the foregoing first embodiment in that in the curved liquid crystal display device 102 of this embodiment, the patterned optical compensation films 50 are disposed between the lower substrate 20 and the lower polarizer film 42. That is, the patterned optical compensation films 50 may be formed on the second outer surface 20B of the lower substrate 20 first, followed by the formation of the lower polarizer film 42.

Figure 14:
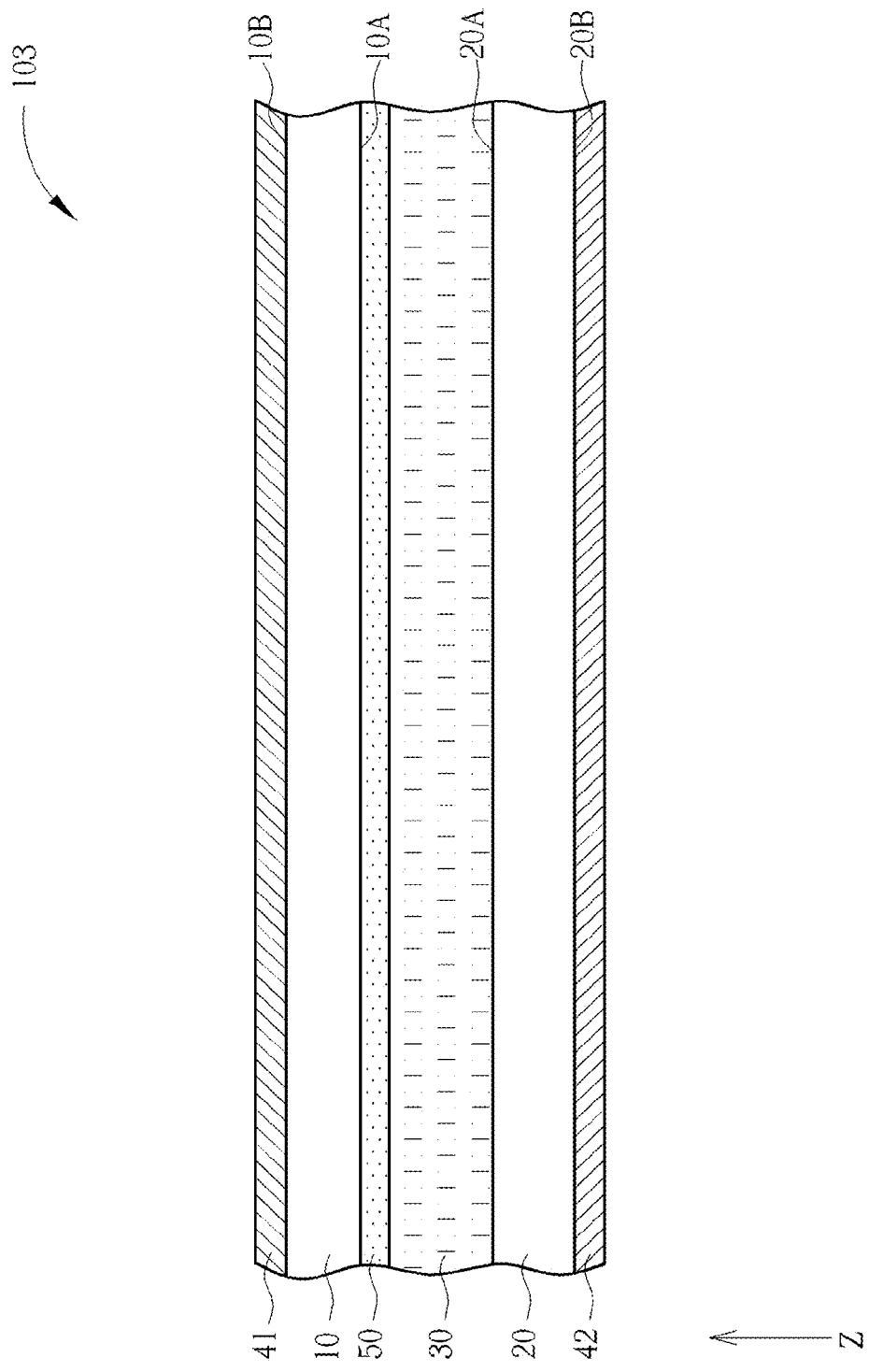
FIG. 14 is a schematic view of a curved liquid crystal display device according to a third embodiment of the present invention.

Reference is now made to FIG. 14. FIG. 14 is a schematic view of a curved liquid crystal display device according to a third embodiment of the present invention. As shown in FIG. 14, this embodiment differs from the foregoing first embodiment in that in the curved liquid crystal display device 103 of this embodiment, the patterned optical compensation films 50 are disposed between the upper substrate 10 and the liquid crystal layer 30. That is, the patterned optical compensation films 50 may be formed on the first inner surface 10A of the upper substrate 10 first, followed by the formation of the liquid crystal layer 30 between the upper substrate 10 and the lower substrate 20.

Figure 15:
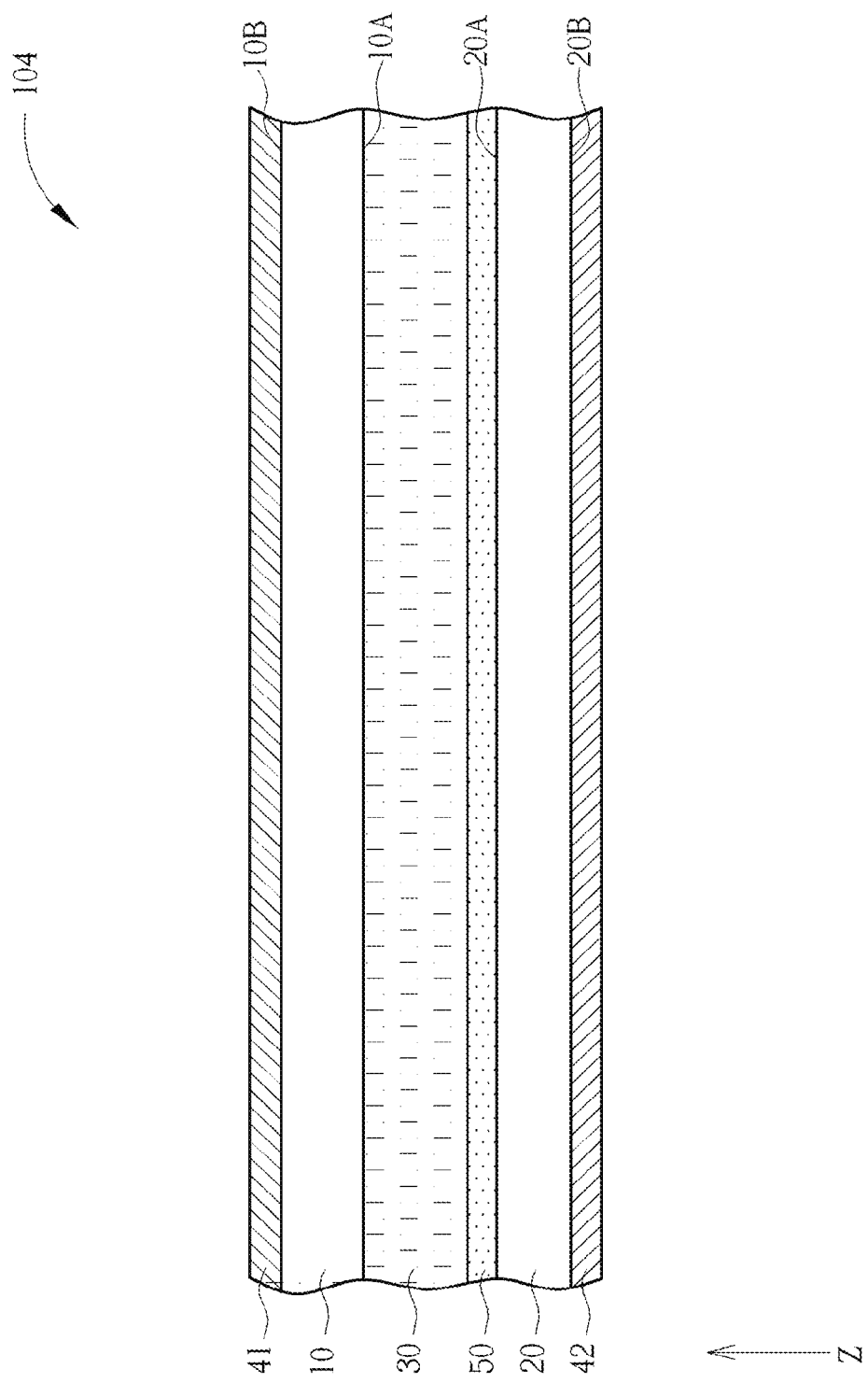
FIG. 15 is a schematic view of a curved liquid crystal display device according to a fourth embodiment of the present invention.

Reference is now made to FIG. 15. FIG. 15 is a schematic view of a curved liquid crystal display device according to a fourth embodiment of the present invention. As shown in FIG. 15, this embodiment differs from the foregoing first embodiment in that in the curved liquid crystal display device 104 of this embodiment, the patterned optical compensation films 50 are disposed between the lower substrate 20 and the liquid crystal layer 30. That is, the patterned optical compensation films 50 may be formed on the second inner surface 20A of the lower substrate 20 first, followed by the formation of the liquid crystal layer 30 between the upper substrate 10 and the lower substrate 20.

Reference is now made to FIG. 16. FIG. 16 is a schematic view of a curved liquid crystal display device according to a fifth embodiment of the present invention. As shown in FIG. 16, this embodiment differs from the foregoing first embodiment in that the curved liquid crystal display device 105 of this embodiment may include only the first patterned optical compensation film 51, the second patterned optical compensation film 52, the third patterned optical compensation film 53, and the fourth patterned optical compensation film, and does not include the fifth to eighth patterned optical compensation films of the foregoing first embodiment. That is, in the present invention, the number of patterned optical compensation films 50 to be disposed may be determined according to the degree of light leakage in each region of the curved liquid crystal display device.

As described above, in the curved liquid crystal display device of the present invention, patterned optical compensation films having different fast axis directions are disposed in local regions to compensate for a phenomenon of uneven light leakage caused by the uneven stress distribution in the local regions, thereby achieving an effect of improving the display quality of the curved liquid crystal display device. In addition, the patterned optical compensation films of the present invention are disposed only locally in the curved liquid crystal display device, that is, some regions in the curved liquid crystal display device, for example, the central region that is less likely to experience light leakage caused by bending, are not provided with any patterned optical compensation film, so as to avoid adverse effects that might be caused when the patterned optical compensation films are disposed globally.

The foregoing are merely preferred embodiments of the present invention, and any equivalent variations and modifications made according to the claims of the present invention shall fall within the scope of the present invention.

What is claimed is:

1. A curved liquid crystal display device, comprising:
   an upper substrate, having a first inner surface and a first outer surface;
   a lower substrate, disposed opposite to the upper substrate, wherein the lower substrate has a second inner surface and a second outer surface, and the second inner surface faces the first inner surface of the upper substrate;
   a liquid crystal layer, sandwiched between the upper substrate and the lower substrate;
   an upper polarizer film, disposed on the first outer surface of the upper substrate;
   a lower polarizer film, disposed on the second outer surface of the lower substrate; and
   a plurality of patterned optical compensation films, disposed locally between the upper polarizer film and the lower polarizer film, wherein fast axis directions of at least two of the patterned optical compensation films are different from each other,
   wherein a gap exists between at least two of the patterned optical compensation films that are disposed adjacent to each other.

2. The curved liquid crystal display device according to claim 1, wherein the patterned optical compensation films do not overlap each other in a vertical projection direction.

3. The curved liquid crystal display device according to claim 1, further comprising a first corner, a second corner, a third corner, and a fourth corner that are arranged in a clockwise direction, wherein the patterned optical compensation films comprise a first patterned optical compensation film, a second patterned optical compensation film, a third patterned optical compensation film, and a fourth patterned optical compensation film that are respectively disposed at the first corner, the second corner, the third corner, and the fourth corner.

4. The curved liquid crystal display device according to claim 3, wherein a fast axis direction of the first patterned optical compensation film is different from a fast axis direction of the second patterned optical compensation film, and the fast axis direction of the first patterned optical compensation film is different from a fast axis direction of the fourth patterned optical compensation film.

5. The curved liquid crystal display device according to claim 3, wherein the upper polarizer film has a transmission axis direction, a first angle exists between a fast axis direction of the first patterned optical compensation film and the transmission axis direction, a second angle exists between a fast axis direction of the second patterned optical compensation film and the transmission axis direction, a third angle exists between a fast axis direction of the third patterned optical compensation film and the transmission axis direction, and a fourth angle exists between a fast axis direction of the fourth patterned optical compensation film and the transmission axis direction.

6. The curved liquid crystal display device according to claim 5, wherein four quadrants are defined by the transmission axis direction and an orthogonal direction orthogonal to the transmission axis direction, the first angle and the third angle are located in a same respective quadrant of the first and third patterned optical compensation films, and the second angle and the fourth angle are located in a same respective quadrant of the second and fourth patterned optical compensation films.

7. The curved liquid crystal display device according to claim 5, wherein an absolute value of the first angle is the same as an absolute value of the third angle.

8. The curved liquid crystal display device according to claim 5, wherein an absolute value of the second angle is the same as an absolute value of the fourth angle.

9. The curved liquid crystal display device according to claim 3, wherein the patterned optical compensation films further comprise a fifth patterned optical compensation film, a sixth patterned optical compensation film, a seventh patterned optical compensation film, and an eighth patterned optical compensation film that are respectively disposed adjacent to the first patterned optical compensation film, the second patterned optical compensation film, the third patterned optical compensation film, and the fourth patterned optical compensation film, a fast axis direction of the first patterned optical compensation film is different from a fast axis direction of the fifth patterned optical compensation film, a fast axis direction of the second patterned optical compensation film is different from a fast axis direction of the sixth patterned optical compensation film, a fast axis direction of the third patterned optical compensation film is different from a fast axis direction of the seventh patterned optical compensation film, and a fast axis direction of the fourth patterned optical compensation film is different from a fast axis direction of the eighth patterned optical compensation film.

10. The curved liquid crystal display device according to claim 9, wherein the upper polarizer film has a transmission axis direction, a fifth angle exists between the fast axis direction of the fifth patterned optical compensation film and the transmission axis direction, a sixth angle exists between the fast axis direction of the sixth patterned optical compensation film and the transmission axis direction, a seventh angle exists between the fast axis direction of the seventh patterned optical compensation film and the transmission axis direction, and an eighth angle exists between the fast axis direction of the eighth patterned optical compensation film and the transmission axis direction.

11. The curved liquid crystal display device according to claim 10, wherein four quadrants are defined by the transmission axis direction and an orthogonal direction orthogonal to the transmission axis direction, the fifth angle and the seventh angle are located in a same respective quadrant of the fifth and seventh patterned optical compensation films, and the sixth angle and the eighth angle are located in a same respective quadrant of the sixth and eight patterned optical compensation films.

12. The curved liquid crystal display device according to claim 10, wherein an absolute value of the fifth angle is the same as an absolute value of the seventh angle.

13. The curved liquid crystal display device according to claim 10, wherein an absolute value of the sixth angle is the same as an absolute value of the eighth angle.

14. The curved liquid crystal display device according to claim 1, wherein the patterned optical compensation films are disposed between the upper substrate and the upper polarizer film.

15. The curved liquid crystal display device according to claim 1, wherein the patterned optical compensation films are disposed between the lower substrate and the lower polarizer film.

16. The curved liquid crystal display device according to claim 1, wherein the patterned optical compensation films are disposed between the upper substrate and the liquid crystal layer.

17. The curved liquid crystal display device according to claim 1, wherein the patterned optical compensation films are disposed between the lower substrate and the liquid crystal layer.

18. The curved liquid crystal display device according to claim 1, wherein an optical path difference of each of the patterned optical compensation films is 0.5 to 1.5 times an optical path difference of a light leakage region corresponding to the respective patterned optical compensation film.

19. A curved liquid crystal display device, comprising:
an upper substrate and a lower substrate;
a liquid crystal layer, sandwiched between the upper substrate and the lower substrate;
an upper polarizer film, disposed on the upper substrate;
a lower polarizer film, disposed on the lower substrate; and
a plurality of non-overlapping patterned optical compensation films, disposed in a single layer locally between the upper polarizer film and the lower polarizer film,
wherein the plurality of patterned optical compensation films does not collectively cover an entire area of the single layer, such that certain areas of the single layer are devoid of any patterned optical compensation film.

* * * * *